United States Patent [19]

Lamarche

[11] Patent Number: 4,530,673
[45] Date of Patent: Jul. 23, 1985

[54] SERIES SPRING VIBRATION DAMPERS

[75] Inventor: Paul E. Lamarche, Utica, Mich.

[73] Assignee: Borg-Warner Corporation, Chicago, Ill.

[21] Appl. No.: 538,032

[22] Filed: Sep. 30, 1983

[51] Int. Cl.$^3$ .......................... F16D 3/14; F16D 3/66
[52] U.S. Cl. .................................. 464/64; 192/106.1; 192/106.2; 464/68
[58] Field of Search .................. 464/62, 64, 66–68, 464/63, 81; 192/106.1, 106.2

[56] References Cited

U.S. PATENT DOCUMENTS

| | | | |
|---|---|---|---|
| 799,388 | 9/1905 | Keyes | 464/63 |
| 852,883 | 5/1907 | Keyes | 464/63 |
| 1,627,964 | 5/1927 | Galloway | 464/63 |
| 2,149,887 | 3/1939 | Hickman | 267/20 R |
| 2,574,573 | 11/1951 | Libby | 464/68 |
| 2,632,318 | 3/1953 | Meyer | 464/66 |
| 4,304,107 | 12/1981 | Fall et al. | 464/64 |
| 4,347,717 | 9/1982 | Lamarche | 464/64 |

FOREIGN PATENT DOCUMENTS 1032601 6/1958 Fed. Rep. of Germany .

Primary Examiner—John Petrakes
Attorney, Agent, or Firm—James A. Geppert

[57] ABSTRACT

A torsional vibration damper assembly for use in a torsional coupling or clutch arrangement to provide a low spring rate, high deflection amplitude characteristic, including an input means having driving arms or straps, at least two elongated bowed coil springs, each extending through an arc of approximately 180°, a hub having diametrically opposed radial arms normally in axial alignment with the drive arms, and a plurality of wedges which are inserted between adjacent coils of the bowed springs to separate the springs into several operative segments. The use of the wedges provides spring segments which operate in series.

10 Claims, 10 Drawing Figures

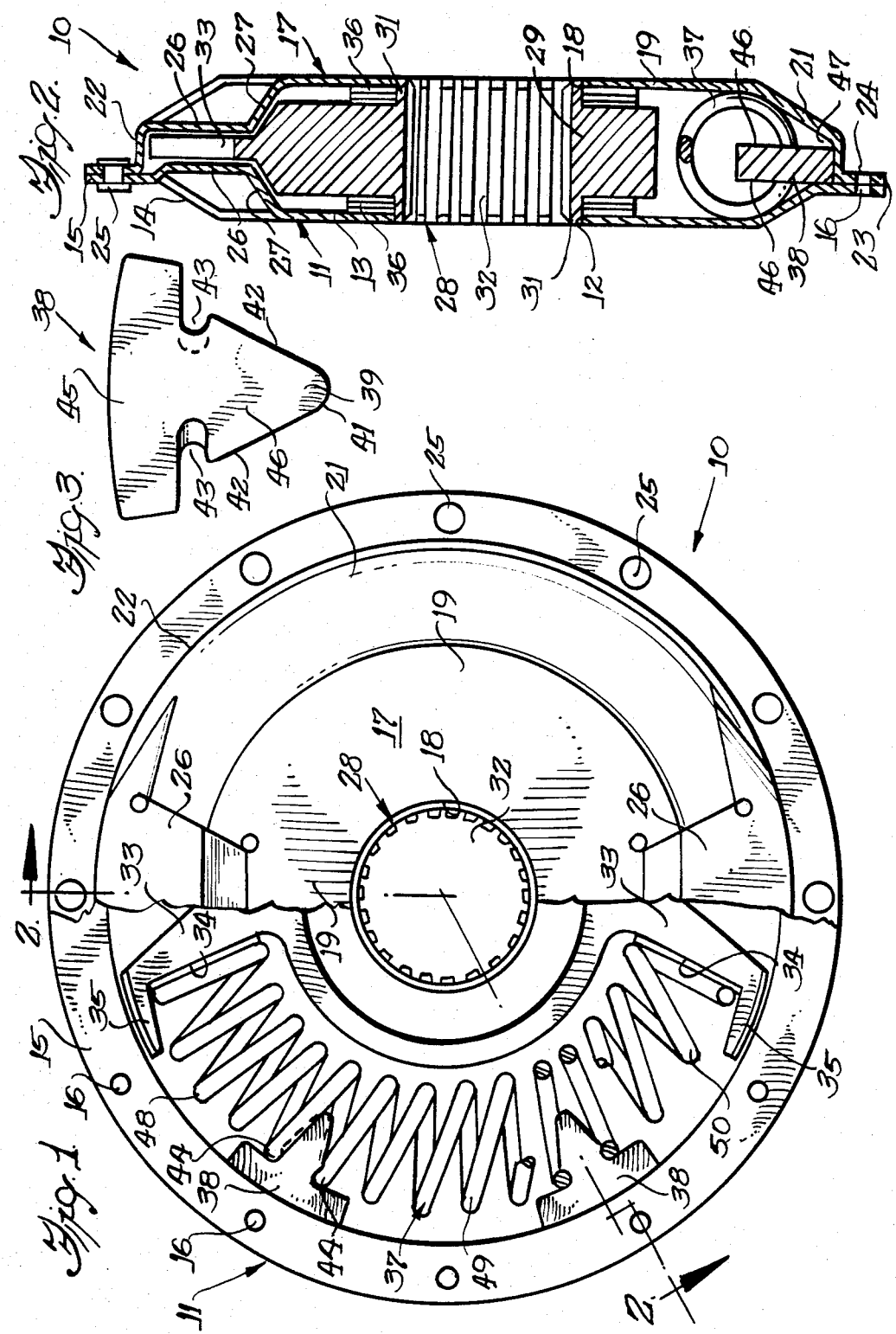

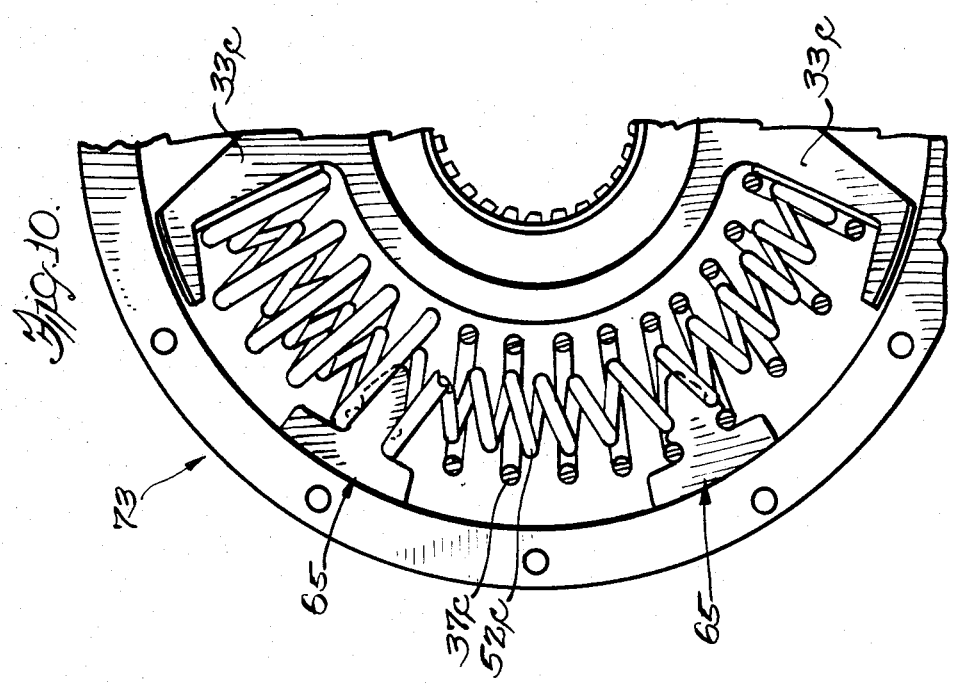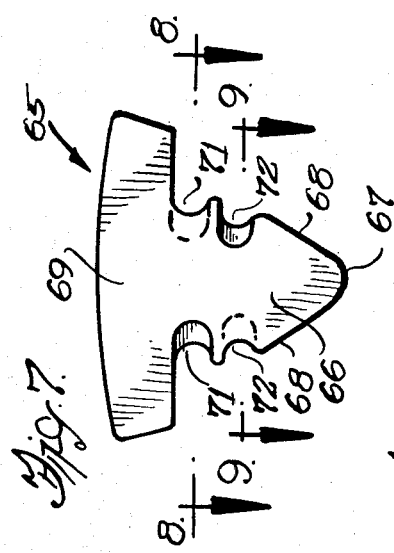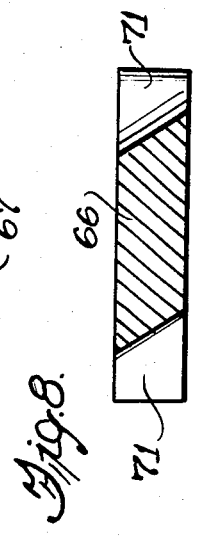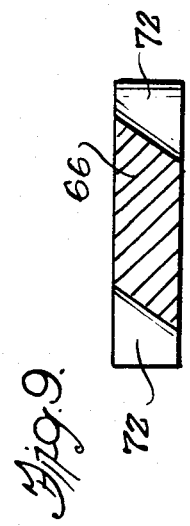

4,530,673

1

SERIES SPRING VIBRATION DAMPERS

BACKGROUND OF THE INVENTION

The present invention relates to a torsional vibration damper assembly for use in a torsional coupling or clutch assembly, such as in a lock-up clutch in a torque converter for the automatic transmission of an automotive vehicle. Vibration in a vehicle drive train has been a long-standing problem in the industry for a clutch-actuated manual transmission. With the use of an automatic transmission in a vehicle, the hydraulic torque converter between the engine and transmission would obviate the problem of vibration in the drive train. Then, to overcome the constant slippage problem of the torque converter, a lock-up clutch was added into the torque converter assembly to lock the impeller and turbine together above a predetermined speed level; however, the vibration problem reappeared, necessitating the use of a vibration damper in the lock-up clutch structure.

In U.S. Pat. No. 4,304,107, a torsional vibration damper assembly is shown for use in a torque converter lock-up clutch which provides for an extended arc of deflection between the clutch input and output having a relatively low rate, high amplitude deflection through the utilization of a series of compression springs or concentric spring sets between the torque input and the hub on the transmission input shaft, with floating spacers or spring dividers interposed between the compression springs of the series. The floating spacers were guided by the interior surface of a cover plate or housing for the damper assembly.

However, where the springs in each series must be matched for their characteristics or wherein all of the springs in the series must have the same rate, problems in stocking, sorting and assembling the springs in the assembly occur. Also, the manufacturing of the compression springs may vary from batch to batch or order to order. Thus, the selection and orientation of the springs in the assembly presents problems. The present invention provides one solution to the above enumerated problem.

SUMMARY OF THE INVENTION

The present invention comprehends the provision of an improved series spring vibration damper to be utilized in a torque converter lock-up clutch wherein a single elongated compression spring in a bowed condition replaces the multiple compression springs between the oppositely disposed and aligned drive arms and hub arms. One or more wedge-like separators are inserted radially inwardly into the elongated compression spring to separate the spring damping action into several substantially separately functioning spring sets. The separators provide outer arcuate bearing surfaces engaging the damper housing to be guided therein.

The present invention also comprehends the provision of an improved series spring vibration damper using at least one bowed elongated compression spring acting in an arc for each side of the damper, allowing the long spring to give maximum force in its bent condition. A second elongated spring concentrically mounted within the first elongated spring or a series of short concentric inner springs may be utilized with the outer bowed spring to provide variations in the damping characteristics of the torsional damping assembly.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view with portions broken away of a torsional vibration damper assembly embodying the present invention.

FIG. 2 is a cross sectional view of the damper assembly taken on the irregular line 2—2 of FIG. 1.

FIG. 3 is an enlarged front elevational view of a spring divider utilized in the assembly.

FIG. 7 is an alternate embodiment of spring divider utilized with concentric damping springs.

FIG. 8 is a cross sectional view taken on the line 8—8 of FIG. 7.

FIG. 9 is a cross sectional view taken on the line 9—9 of FIG. 7.

FIG. 10 is a partial rear elevational view of a fourth embodiment of damper assembly.

DESCRIPTION OF PREFERRED EMBODIMENTS

Figure 4:
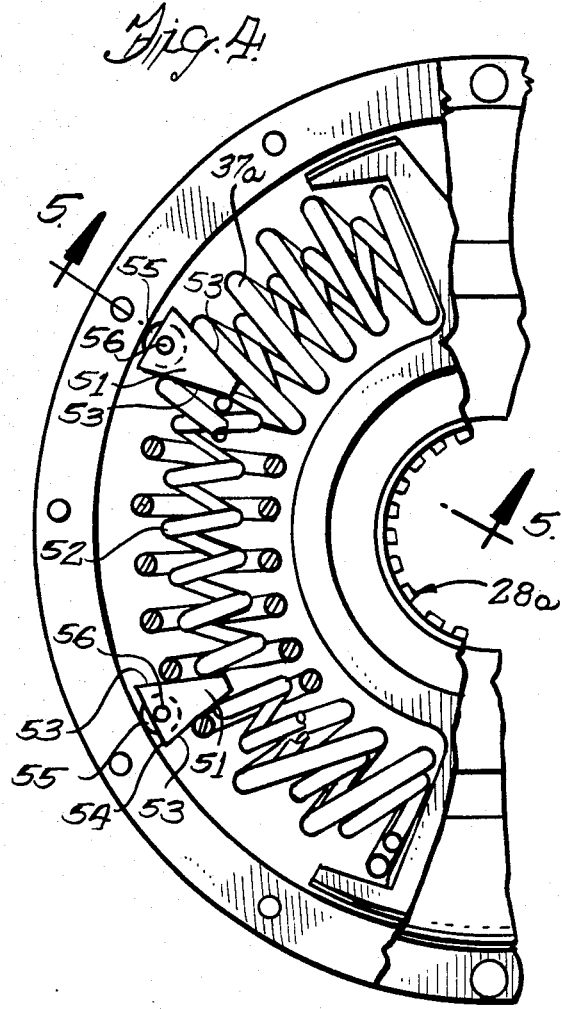
FIG. 4 is a partial rear elevational view with portions broken away of an alternate embodiment of damper assembly.

Referring more particularly to the disclosure in the drawings wherein are shown illustrative embodiments of the present invention, FIGS. 1 through 3 disclose a torsional vibration damper assembly 10 adapted to be operatively connected to a torque input means (not shown), such as a clutch piston plate housed in a hydraulic torque converter. The damper assembly includes a housing formed of a pair of plates 11 and 17, the front plate 11 having a central opening 12 and a flat plate portion 13 terminating in an outer inclined portion 14 and a peripheral flange 15 having circumferentially spaced openings 16. The rear plate 17 includes a central opening 18 in a flat plate portion 19, an inclined outer portion 21 terminating in an axial wall 22, and a peripheral flange 23 having openings 24 axially aligned with openings 16 to receive suitable securing means, such as rivets 25, to secure the plates together and connect the housing to the torque input means.

Positioned diametrically oppositely in and integral with each plate are a pair of inwardly offset drive straps 26,26 which are generally parallel and axially aligned with the hub arms 33 to be later described. Each strap is connected to the flat plate portion 13 or 19 by an offset portion 27. A hub 28 includes a central body portion 29 with oppositely extending shoulders 31 received in the axially aligned openings 12 and 18 of the housing plates; the body portion having an internally splined central passage 32 to receive the splined end of a transmission input shaft (not shown) leading to the vehicle transmission. A pair of oppositely disposed hub arms 33,33 extend radially outward from the hub body portion with outward diverging edges 34 terminating in circumferentially oppositely extending fingers 35. One or more friction washers 36 may be located between the hub body at each housing plate, as shown in FIG. 2, to provide frictional drag on the relative rotation between the hub and the damper housing.

Located within the housing on each side between the opposite hub arms 33 is a bowed elongated compression spring 37 which will operate to dampen the vibrations from the torque input means in an arc. Positioned at spaced intervals within the housing are a pair of wedge-like spring dividers 38,38 inserted between adjacent coils of the spring and acting to functionally divide the spring into three segments 48, 49, 50. Each divider 38 has a wedgelike body portion 39 with a relatively narrow rounded base 41 and a pair of outwardly diverging edges 42,42 with notches or grooves 43,43 therein to receive adjacent coil portions 44 of the spring and terminating in a circumferentially extending arcuate head 45 which travels in the channel 47 formed by the inclined portions 14,21 and axial wall 22 of the housing plates. The divider also has generally parallel front and back walls 46,46 merging into the head 45.

Adjacent coil portions 44 engage the grooves 43 on the opposite diverging edges 42 to effectively divide the spring functionally into three substantially equal segments having identical spring characteristics, with the segments cooperating with the dividers to function substantially like three individual damper springs in the manner disclosed in U.S. Pat. No. 4,304,107.

Figure 5:
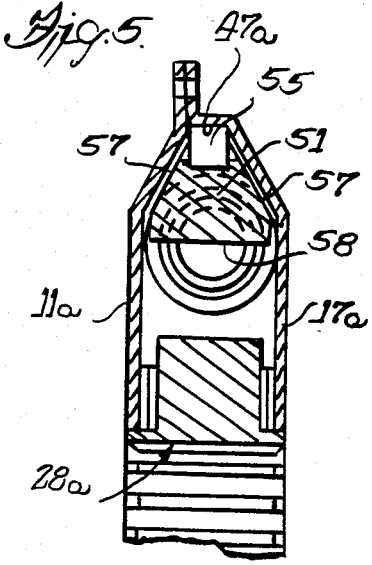
FIG. 5 is a cross sectional view taken on the line 5—5 of FIG. 4.
Figure 6:
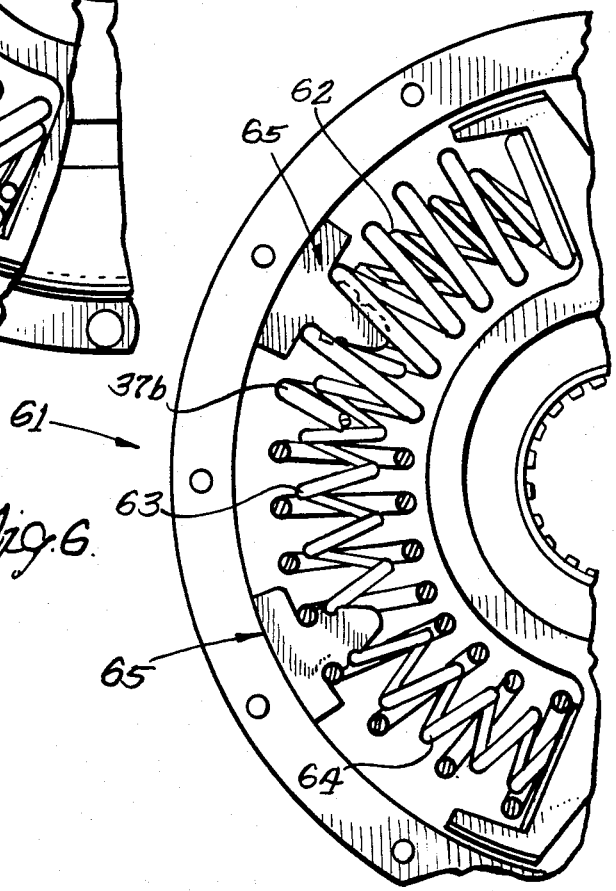
FIG. 6 is a partial rear elevational view with portions broken away of a third embodiment of damper assembly.

FIGS. 4 and 5 disclose an alternate embodiment of spring divider or wedge 51 utilized with either a single bowed elongated compression spring, as shown in FIG. 1, or a pair of concentric elongated bowed springs 37a and 52. The hub 28a and housing plates 11a and 17a are substantially identical with that shown in FIGS. 1 through 3. The wedge 51 has outwardly diverging edges 53,53 terminating in an outer surface 54 carrying a roller 55 mounted on a pin or shaft 56 secured in the wedge; the roller being received in a relatively deep recess in the surface 54. The front and rear surfaces 57,57 are outwardly converging from a relatively wide base 58 as seen in FIG. 5. The roller contacts and rides in the channel 47a, with this embodiment functioning generally like the structure of FIG. 1, except that each wedge 51 projects into the coils of the one or two concentric springs and does not contain notches to receive the spring coils.

FIGS. 6 through 9 disclose a third embodiment of damper assembly 61 similar to that shown in FIGS. 1 and 2 except that an elongated bowed spring 37b is utilized in conjunction with three separate inner springs 62,63 and 64; the inner springs being concentric with and fitting within the elongated spring 37b. A pair of wedge-shaped spring dividers 65,65 are adapted to be inserted between coils of the spring 37b and separate the ends of the inner coil springs 62,63 and 64. Each divider 65, as seen in FIGS. 7 through 9, has a wedge-shaped body 66 with outwardly diverging edges 68,68 extending from a rounded inner end 67 to an enlarged circumferentially elongated head 69. The edges are provided with two pairs of notches 71,71 and 72,72. The upper pair of notches 71,71 receiving the coils of spring 37b are inclined in one direction as seen in FIG. 8, while the lower pair of notches 72,72 receiving the end coils of adjacent springs 62,63 or 63,64 are inclined in the opposite direction (FIG. 9). Obviously, both sets of notches could be inclined in the same direction depending on the spring coil direction and pitch.

FIG. 10 discloses a further damper embodiment 73 similar to that of FIGS. 4 and 5 but utilizing the wedge-like divider 65 shown in FIGS. 7 through 9. In this embodiment, a pair of bowed elongated concentric springs 37c,52c are positioned between the hub arms 33c, with only one pair of springs being shown in FIG. 10. The dividers 65,65 are inserted into the spring coils at appropriate locations to provide a structure which acts like three separate springs acting in series in the manner previously described. Although two dividers are shown for each bowed elongated spring, one or three dividers could be utilized depending on the space available and the desired spring characteristics.

I claim:

1. A vibration damper assembly to transmit torque between driving and driven elements, comprising an input member operatively connected to torque input means, a hub assembly operatively connected to torque output means and including at least two circumferentially equally spaced radial hub arms, said input means comprising a substantially enclosed housing journalled on said hub assembly and inwardly offset drive straps integral with said housing paralleling and axially aligned with said hub arms, an elongated bowed compression spring received in said housing and extending between the edges of adjacent hub arms and drive straps, and at least one wedge-shaped divider adapted to be inserted between adjacent coils of each said spring at a selected position to divide said bowed spring into two or more functioning spring segments.

2. A vibration damper assembly as set forth in claim 1, in which said spring divider includes a wedge-shaped body having outwardly diverging edges terminating in an elongated arcuate head, said housing having a peripheral channel receiving said spring divider heads and hub arms for movement therein.

3. A vibration damper assembly as set forth in claim 2, in which said divider body has a pair of notches formed in the edges to receive adjacent coils of said spring.

4. A vibration damper assembly as set forth in claim 1, in which said spring divider include a wedge-shaped body with outwardly diverging edges and terminating in an outer end having a roller rotatably mounted therein, and said housing has a peripheral channel receiving said rollers for movement therein.

5. A vibration damper assembly as set forth in claim 1, wherein a pair of spring dividers are inserted between the coils of said bowed spring at locations to divide said spring into three functioning spring segments.

6. A vibration damper assembly as set forth in claim 1, in which a pair of concentric bowed elongated springs are positioned between adjacent hub arm edges, and said dividers each have two pair of notches on the opposite edges to receive adjacent coils of the concentric springs.

7. A vibration damper assembly as set forth in claim 1, in which a single bowed elongated spring is used in combination with three concentric abutting inner springs extending substantially the length of the outer bowed spring between adjacent hub arm edges.

8. A vibration damper assembly as set forth in claim 7, wherein a pair of spring dividers are inserted between the coils of said bowed spring at locations so as to separate the ends of the inner shorter springs.

9. A vibration damper assembly as set forth in claim 8, in which each divider includes a first pair of notches formed on the opposite edges adjacent the enlarged head to receive adjacent coils of the bowed spring and a second pair of notches spaced inwardly from the first pair of notches to receive end coils of said inner shorter springs.

10. A vibration damper assembly as set forth in claim 1, in which said hub arms and said drive straps have outwardly diverging edges which are axially aligned in the absence of applied torque.

* * * * *